(12) United States Patent
Jahnke

(10) Patent No.: US 6,579,546 B1
(45) Date of Patent: Jun. 17, 2003

(54) METHOD OF MAKING MICROWAVABLE YEAST-LEAVENDED BAKERY PRODUCT CONTAINING DOUGH ADDITIVE

(75) Inventor: Michael Jahnke, Burnsville, MN (US)

(73) Assignee: Brechet & Richter Company, Minneapolis, MN (US)

( * ) Notice: Subject to any disclaimer, the term of this patent is extended or adjusted under 35 U.S.C. 154(b) by 0 days.

(21) Appl. No.: 09/753,485

(22) Filed: Jan. 3, 2001

(51) Int. Cl.[7] ................................................ A21D 2/00
(52) U.S. Cl. ......................... 426/19; 426/20; 426/237; 426/243; 426/549; 426/65
(58) Field of Search ............................ 426/19, 94, 243, 426/549, 653, 20, 237

(56) References Cited

U.S. PATENT DOCUMENTS

| | | | |
|---|---|---|---|
| 2,158,392 A | 5/1939 | Ament | 426/18 |
| 3,271,164 A | 9/1966 | Andt | 426/24 |
| 4,244,980 A | 1/1981 | Fischer et al. | 426/554 |
| 4,444,799 A | 4/1984 | Vanderveer et al. | 426/549 |
| 4,842,876 A * | 6/1989 | Anderson et al. | 426/243 |
| 5,035,904 A * | 7/1991 | Huang et al. | 426/243 |
| 5,110,614 A | 5/1992 | Corbin et al. | 426/555 |
| 5,176,927 A | 1/1993 | Haarasilta et al. | 426/20 |
| 5,204,131 A | 4/1993 | Frattinger et al. | 426/243 |
| 5,260,076 A | 11/1993 | Ffurcsik et al. | 426/21 |
| 5,266,345 A | 11/1993 | Corbin et al. | 426/555 |
| 6,248,388 B1 * | 6/2001 | Van Eendenburg et al. | 426/556 |

OTHER PUBLICATIONS

Recipe conversion for microwave, 1979, pp. 124–125.*
Encyclopedia of Chemical Technology, 1992, pp. 882,887.*

* cited by examiner

*Primary Examiner*—Lien Tran
(74) *Attorney, Agent, or Firm*—Kinney & Lange, P.A.

(57) ABSTRACT

A microwave baking dough additive that has a gelling component, a gum component and an enzyme component. A method is disclosed controlling moisture migration or starch recrystallization in yeast-leavened bakery products that are baked by microwave energy. A frozen bakery dough is transformed into a fresh-baked, microwavable, yeast-leavened bakery product.

34 Claims, 3 Drawing Sheets

METHOD OF MAKING MICROWAVABLE YEAST-LEAVENDED BAKERY PRODUCT CONTAINING DOUGH ADDITIVE

BACKGROUND OF THE INVENTION

During the last decade, a dramatic change in consumer eating patterns has been observed. Longer working hours, changing family structures and the pursuit of a healthier lifestyle are all factors that have influenced food purchasing decisions. As a result, consumers typically seek out foods that taste fresh, require minimal preparation time, may be microwaved, are conveniently packaged, and/or are portable.

The use of baking is one process food manufacturers may use to produce foods that meet the above-mentioned characteristics. Unfortunately, production of fresh-baked yeast-leavened bakery products are challenging due to a number of variables. For example, fresh-baked yeast-leavened bakery products must undergo yeast leavening that depends on factors such as yeast viability, temperature, pH, starch concentration, or moisture. Any variations during yeast-leavening typically results in inconsistencies in taste and/or texture in the fresh-baked yeast-leavened product.

Furthermore, inconsistencies in the texture of yeast-leavened bakery products occur, particularly when application of microwave energy is required to complete preparation. During application of microwave energy, the yeast-leavened bakery product undergoes rapid staling and toughening that changes the palatability of the yeast-leavened bakery product and hampers delivery of a fresh-baked eating experience during consumption of the microwaved yeast-leavened bakery product. Several bakers and food manufacturers have responded by incorporating large amounts of eggs and/or shortening into the yeast-based bakery dough prior to application of microwave energy to prevent toughening and staling. Unfortunately, incorporating eggs and/or shortening typically increases the cost of producing microwavable yeast-leavened bakery products.

Even more challenging for bakers and food manufacturers is to produce a frozen bakery product that can be transformed into a fresh-baked yeast-leavened bakery product using microwave energy due to the aforementioned difficulties with staling and toughening of the yeast-leavened bakery product The benefits of transforming a frozen bakery product into a fresh-baked yeast-leavened product using microwave energy includes savings in preparation time and/or labor costs incurred during yeast-leavened bakery production, rapid preparation of consistent yeast-leavened bakery products, convenience of fresh-baked yeast-leavened products, reduced inventory costs, extended product shelf-life, and ease in serving, for example. Therefore, an urgent need presently exists to cost-effectively manufacture fresh-baked yeast-leavened bakery products that may be subjected to application of microwave energy without undergoing rapid toughening and staling. Additionally, an urgent need presently exists for frozen bakery products that may be transformed into a fresh-baked yeast-leavened products through microwave energy.

BRIEF SUMMARY OF THE INVENTION

The present invention includes a microwave baking dough additive that has a gum component and an enzyme component. The present invention also includes a method of controlling moisture migration and starch recrystallization in microwavable yeast-leavened bakery products. The present invention further relates to a method of transforming a frozen bakery product into a fresh-baked yeast-leavened bakery product via application of microwave energy.

DETAILED DESCRIPTION

The present invention generally relates to a microwavable yeast-leavened bakery product and to a method of making this microwavable yeast-leavened bakery product. More specifically, the present invention relates to a microwavable yeast-leavened dough or bakery product that is transformed into a fresh-baked yeast-leavened bakery product by application of microwave-energy. The present invention further relates to a method of controlling moisture migration and/or starch recrystallization in a microwavable yeast-leavened bakery product.

Figure 1:
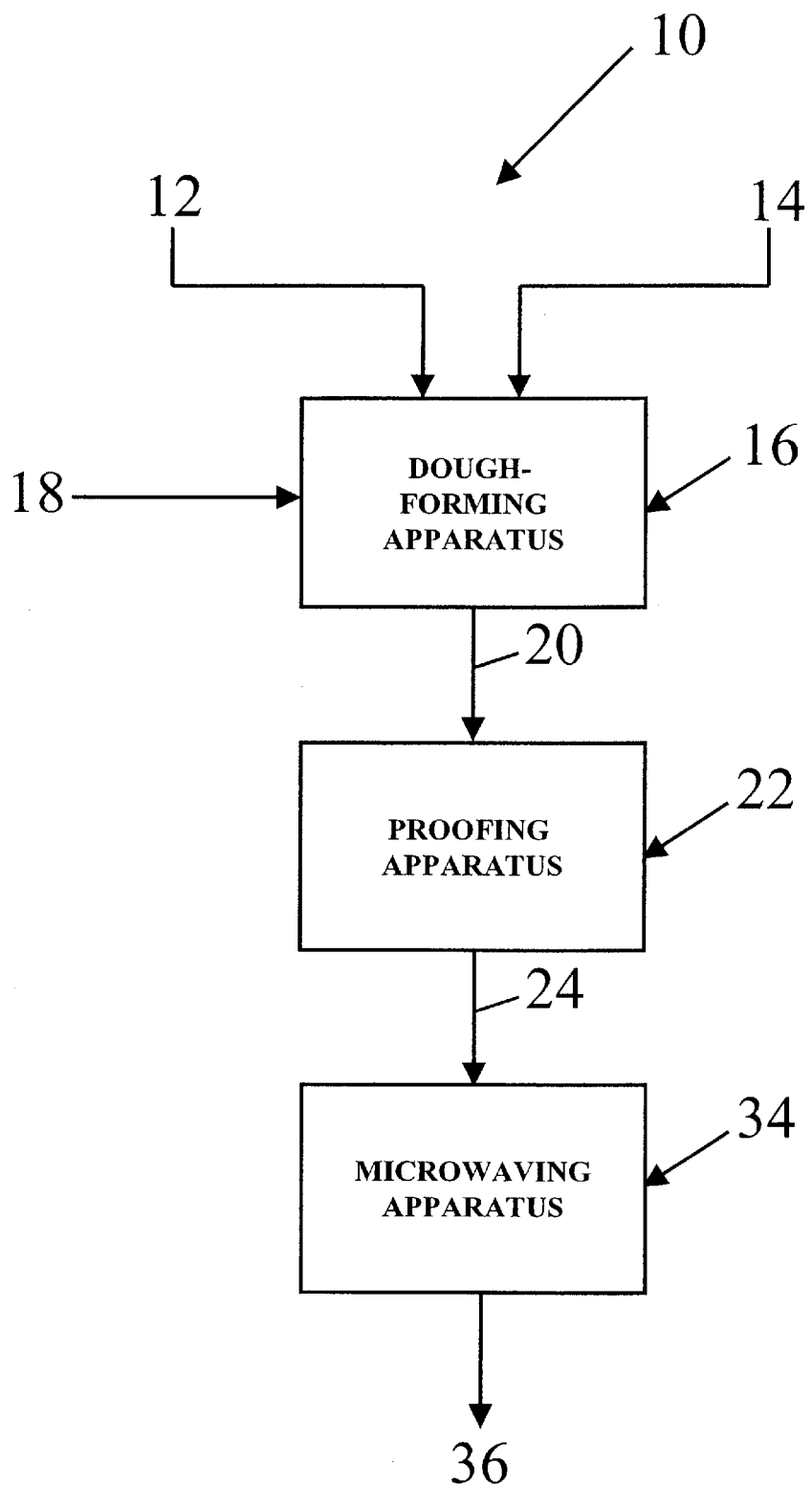
FIG. 1 is a schematic of a process for producing a microwavable yeast-leavened bakery product in accordance with the present invention.

A process for producing a fresh-baked, microwavable yeast-leavened bakery product in accordance with the present invention is generally depicted at 10 in FIG. 1. In the process 10, a microwave baking dough additive 12 and an unrisen dough composition 14 are introduced into a dough-forming apparatus 16 to homogeneously blend the microwave baking dough additive 12 into the unrisen dough composition 14. The microwave baking dough additive 12 includes a gelling component, a gum component, and an enzyme component (not shown). The unrisen dough composition 14 includes a flour component and a yeast component (not shown).

Alternatively, one or more optional liquid components 18 may also be introduced into the dough-forming apparatus 16 along with the microwave baking dough additive 12 and the unrisen dough composition 14. The dough-forming apparatus 16 transforms the microwave baking dough additive 12, the unrisen dough composition 14 and any optional liquid components 18 into a microwavable unrisen dough composition 20.

After the microwavable unrisen dough composition 20 is suitably formed in the dough-forming apparatus 16, the microwavable unrisen dough composition 20 may be fermented in or during transport to a proofing apparatus 22 to form a yeast-leavened microwavable dough 24. After fermenting, the yeast-leavened microwavable dough 24 may be transferred from the proofing apparatus 22 to a microwavable apparatus 34 to bake the yeast-leavened microwavable dough 24 via application of microwave energy and form a fresh-baked, microwavable yeast-leavened product 36.

It has been discovered that incorporating a microwave baking dough additive that includes a gelling component, a gum component and an enzyme component into an unrisen dough composition in accordance with the present invention produces a yeast-leavened microwavable dough that may be baked by application of microwave energy to form a fresh-baked microwavable yeast-leavened bakery product. Baking a yeast-leavened dough or a yeast-leavened bakery product via application of microwave energy typically results in rapid toughening of the yeast-leavened dough or yeast-leavened bakery product. Such rapid toughening may be related to uneven moisture migration and removal that occurs during or after application of microwave energy. Such rapid toughening of the yeast-leavened dough and/or the yeast-leavened bakery product may also be the result of starch recrystalization.

The incorporation of the microwave baking dough additive into the unrisen dough composition forms a yeast-leavened microwavable dough that may be transformed into a fresh-baked microwavable yeast-leavened bakery product through application of microwave energy. Additionally, including the microwave baking dough additive into the unrisen dough composition may facilitate formation of one or more structures in the yeast-leavened dough that is capable of binding water, and, preventing and controlling moisture migration and/or starch recrystalization both during or after application of microwave energy.

The gelling component may be generally blended into the dough additive 12, the unrisen dough composition 14, the microwavable unrisen dough composition 20, or the yeast-leavened microwavable dough 24 as a liquid, vapor, or in granular form. The form of the gelling component that is selected preferably permits the gelling component (1) to remain stable prior to introduction into the dough additive 12, the unrisen dough composition 14, the microwavable unrisen dough composition 20, or the yeast-leavened microwavable dough 24, (2) to be homogeneously blended into the dough additive 12, the unrisen dough composition 14, the microwavable unrisen dough composition 20, or the yeast-leavened microwavable dough 24, and (3) to prevent and control starch recrystallization and/or moisture migration in the yeast-leavened microwavable dough 24 or fresh-baked, microwavable, yeast-leavened bakery product 36 when included as part of the dough additive 12, the unrisen dough composition 14, the microwavable unrisen dough composition 20, or the yeast-leavened microwavable dough 24.

Additionally, the gelling component that is used in accordance with the present invention is an amount that is effective in forming one or more cross-links with the gum component. Furthermore, those of ordinary skill in the art will recognize that the amount of the gelling component may vary, depending upon the gelling component, the gum component, or the enzyme component selected, any other electrolytes, non-electrolytes, or other ingredients, ionic charge of the gelling component, temperature, pH, and/or solvent requirements for the gelling component, dough additive 12 or unrisen dough composition 14, the molecular weight or particle size of the gelling and/or gum component, altitude, the strength of the gel matrix, or the amount of time required to form a gel matrix.

Those of ordinary skill in the art may also vary the amount of gelling component based upon desired characteristics of the unrisen dough composition 14, the microwavable unrisen dough composition 20, and/or the fresh-baked, microwavable, yeast-leavened bakery product 36. Consequently, the amount of the gelling component maybe any amount that provides a necessary gel matrix strength and/or gelling time to obtain desired characteristics of the microwavable unrisen dough composition 20, the yeast-leavened microwavable dough 24, or the fresh-baked, microwavable, yeast-leavened bakery product 36. As one non-exhaustive example, the gelling component may range from about 1 part gelling component per $10^6$ parts gum component to about $10^6$ parts gelling component per 1 part gum component.

By "gelling component" is meant one or more ions that form one or more cross-links with the gum component in less than about 60 seconds at a room temperature of about 70° F. Some non-exhaustive examples of ions that may be used to gel the gum component may include ions of sodium, potassium, lithium, magnesium, calcium, manganese, iron, cobalt, nickel, copper, zinc, phosphorous, molybdenum, chromium, tin, vanadium, selenium, silicon, other charged ions, or any combination thereof. Preferably, the gelling component includes one or more calcium ions to form one or more cross-links with the gum component. Still more preferably, the gelling component, such as the gelling component that includes calcium ions permits the formation of one or more cross-links in less than about 60 seconds at a room temperature of about 70° F. More preferably, the gelling component, such as the gelling component that includes calcium ions permits one or more cross-links to be formed in less than 30 seconds at a room temperature of about 70° F. Most preferably, the gelling component, such as the gelling component that includes calcium ions permits one or more cross-links to be formed in less than about 15 seconds at a room temperature of about 70° F.

The gelling component, such as the gelling component that includes calcium ions may be supplied as individual calcium salts, or supplied in various prepared mixtures of two or more calcium salts that are subsequently combined to form the gelling component. Some non-exhaustive examples of calcium salts include calcium acetate, calcium citrate, calcium gluconate, calcium glycerol phosphate mono-calcium phosphate, mono-calcium phosphate anhydrous, di- and tri-calcium phosphate, calcium sulfate, calcium carbonate, calcium lactate, calcium phosphite or any combination of any of these. Preferably the gelling component of the present invention is calcium acetate. Calcium acetate may be obtained from Ashland Chemical Company of Columbus, Ohio, Merck Company of Whitehouse Station, N.J. or American International Chemical, Inc., of Natick, Mass.

Though descriptions of the present invention are primarily made in terms of the preferred gelling component that includes calcium ions, it is to be understood that any other gelling component, such as ions of sodium, potassium, lithium, magnesium, manganese, iron, cobalt, nickel, copper, zinc, phosphorous, molybdenum, chromium, tin, vanadium, selenium, silicon, other charged ions, or any combination of any of these, may be substituted in place of the calcium ions in accordance with the present invention while still realizing benefits of the present invention. Likewise, it is to be understood that any combination of any calcium ion and any other gelling component may be used in accordance with the present invention, while still realizing the benefits of the present invention.

The gum component maybe blended into the dough additive 12, the unrisen dough composition 14, the microwavable unrisen dough composition 20, the yeast-leavened microwavable dough 24 as a liquid, vapor, spray or in granular form. The form of the gum component that is selected preferably permits the gum component (1) to remain stable prior to introduction into the dough additive 12, the unrisen dough composition 14, the microwavable unrisen dough composition 20, the yeast-leavened microwavable dough 24, (2) to be homogeneously blended into the dough additive 12, the unrisen dough composition 14, the microwavable unrisen dough composition 20, the yeast-leavened microwavable dough 24, (3) to control starch recrystallization and/or moisture migration in the yeast-leavened microwavable dough 24 or fresh-baked microwavable yeast-leavened bakery product 36 when included as part of the dough additive 12, the unrisen dough composition 14, the microwavable unrisen dough composition 20, or the yeast-leavened microwavable dough 24, and (4) to transform the microwavable unrisen dough composition 20, and/or the yeast-leavened microwavable dough 24 into a fresh-baked, microwavable, yeast-leavened bakery product 36.

By "gum component" is meant one or more polymers that forms a continuous three-dimensional molecular network to entrap, bind or retain one or more liquids. Additionally, the gum component that is used in accordance with the present invention is capable of being cross-linked by the gelling component. Preferably, the gum component is capable of being cross-linked to form a gel matrix one or more liquid components 18, such as water, milk, honey, syrups or any other liquid components 18 that may be included as part of the microwavable unrisen dough composition 20 in accordance with the present invention.

Furthermore, the gum component is preferably capable of binding and retaining any liquid components, such as water in temperatures ranging from about −100° F. to about 500° F. A temperature range of about −100° F. to about 50° F. may encompass suitable freezing and refrigerator conditions that are used in accordance with the present invention while a temperature range of about 200° F. to about 500° F. may encompass suitable baking conditions used in accordance with the present invention.

The gel matrix that includes the gum component that is cross-linked by the gelling component may be characterized in terms of gel strength and/or gelling time. Additionally, the gum component that is used in accordance with the present invention may be characterized as strong, tenuous, resistant to dissolution or any combination of any of these. Preferably, the gum component that forms a gel matrix with the gelling component is characterized as strong, tenuous, resistant to dissolution or any combination of any of these.

The gum component of the microwave baking dough additive 12 may be included at an amount that is effective in transforming a frozen bakery product into a fresh-baked microwavable yeast-leavened bakery product using microwave energy, or in controlling starch recrystallization or moisture migration when included as part of the dough additive 12, the unrisen dough composition 14, the microwavable unrisen dough composition 20, or the yeast-leavened microwavable dough 24. Furthermore, those of ordinary skill in the art will recognize that the amount of the gum component may be varied, depending upon the gelling component, the gum component, or the enzyme component selected, any other electrolytes, non-electrolytes, or other ingredients; ionic charge of the gum component, temperature, pH, particle size, molecular weight, water-holding capacity, and/or solvent requirements of the gum component; altitude, gel strength or the amount of time required to form a gel matrix.

Those of ordinary skill in the art may also vary the amount of gum component based upon desired characteristics of the unrisen dough composition 14, the microwavable unrisen dough composition 20, or obtaining a fresh-baked microwavable yeast-leavened bakery product 36. Therefore, the amount of the gum component may be any amount that provides a necessary gel matrix strength and/or gelling time to obtain desired characteristics of the unrisen dough composition 14, the microwavable unrisen dough composition 20, or the fresh-baked microwavable yeast-leavened bakery product 36. As one non-exhaustive example, the gum component may be used at a range from about 1 part gum component per $10^6$ part microwavable unrisen dough composition 20 to about 1 part gum component per 1 part microwavable unrisen dough composition 20.

The gum component of the present invention may include one or more gums that are capable of forming a gel matrix with a gelling component. Additionally, the gum component may be supplied as individual gums or supplied in various prepared mixtures of two or more gums that are subsequently combined to form the gum component. Some non-exhaustive examples of suitable gum components that may be used to practice the present invention include alginates, carrageenan, guar gum, locust bean gum, polysaccharides derived from *Pseudomonas aeruginosa* or *Azotobacter vinelandii*, starches like native starches, resistant starches, chemically-and/or physically-modified starches, converted starches, instant starches, high-amylose starches, high-amylopectin starches, waxy starches or any combination of any of these; fiber, protein, or any combination thereof.

Preferably, the gum component of the present invention includes one or more alginate gums that are capable of forming a gel matrix with a gelling component. Still more preferably, the gum component of the present invention includes one or more alginate gums that are capable of forming a gel matrix with the gelling component, such as the gelling component that includes calcium ions in less than 30 seconds at a room temperature of about 70° F. Most preferably, the gum component includes one or more alginate gums that are capable of forming a gel matrix with the gelling component, such as the gelling component that includes calcium ions in less than 15 seconds at a room temperature of about 70° F.

An alginate gum may be characterized as a gum that includes alginic acid and may optionally include ions of sodium, potassium, other alkaline metals, other alkaline earth metals, ammonium, or any combination of any of these; polyvalent ions, such as ions of magnesium, calcium, manganese, iron, cobalt, nickel, copper, zinc, phosphorus, molybdenum, chromium, tin, vanadium, selenium, silicon, or any combination of any of these. Alginic acid may be characterized as a polymer that includes β-D-mannosyluronic acid and α-L-gulosyluronic acid monomers. These two monomers may occur in homogenous regions (composed exclusively of one monomer or the other) or in regions of heterogenous regions (composed of both monomers in a random or alternating pattern). Regions of the alginic acid polymer that include more than one β-D-mannosyluronic monomer maybe referred to as M-blocks while regions containing more than one α-L-gulosyluronic monomer may be referred to as G-blocks.

An alginate gum that includes alginic acid having a higher percentage of G-block regions than M-block regions may form a gel matrix that may be characterized as strong, rigid, hard, brittle, resistant to dissolution, tenuous or any combination of any of these. Similarly, an alginate gum that is derived from alginic acid having a higher percentage of M-block regions than G-block regions may form a gel matrix that may be characterized as elastic, deformable or any combination thereof Additionally, alginic acid originating from different sources, such as giant brown seaweed that includes giant kelp like *Macrocystis pyrifera*, Lessoniaceae, or horsetail kelp, such as *Laminaria digitata*, Lamour, Laminariaceae or sugar kelp, such as *Laminaria saccharina* or algae may provide alginic acid polymers having diverse ratios of M-block regions to G-block regions. As indicated above, the gum component of the present invention preferably forms a gel matrix that is characterized as strong, tenuous, resistant to dissolution or any combination of any of these. Furthermore, the gum component that includes one or more alginate gums, and therefore, the characteristics of the gel matrix derived from the gum component that includes one or more alginate gums may be adjusted based upon the ratio of monomeric units, concentration, source, degree of polymerization of alginic acid, pH and temperatures to obtain a fresh-baked microwavable yeast-leavened bakery product 36 via application of microwave energy.

Though descriptions of the present invention are primarily made in terms of a gum component that is capable of forming a gel matrix with a gelling component, it is to be understood that any other gum component that is capable of forming a gel matrix without a gelling component, such as carrageenan, guar gum, xanthan gum, locust bean gum, polysaccharides derived from *Pseudomonas aeruginosa* or *Azotobacter vinelandii,* starches like native starches, resistant starches, chemically- and/or physically-modified starches, converted starches, instant starches, high-amylose starches, high-amylopectin starches, waxy starches or any combination of any of these; fibers, proteins, or any combination of any of these, may be substituted in place of the gum component gelled in the presence of a gelling component, while still realizing the benefits of the present invention. Likewise, it is to be understood that any combination of any gum component that requires a gelling component and any gum component that does not require a gelling component maybe included in accordance with the present invention, while still realizing the benefits of the present invention.

The gum component of the microwave baking dough additive 12 may be supplied as a gum component that includes individual alginate gums or supplied in various prepared mixtures of two or more alginate gums that are subsequently combined to form the gum component. Some non-exhaustive examples of alginate gums that may be suitable for inclusion in the gum component include sodium alginate, ammonium alginate, sodium calcium alginate, calcium alginate, potassium alginate, esters of alginic acid like acetyl esters, ethyl esters, propyl esters, butyl esters, pentyl esters, hexyl esters, heptyl esters, octyl esters, nonyl esters, decyl esters, propyl glycerol alginate or any combination of any of these. As an example, sodium alginate that is available from Multi-Kem Corporation of Ridgefield, N.J. may be used as the gum component in accordance with the present invention.

The enzyme component may be blended into the dough additive 12, the unrisen dough composition 14, the microwavable unrisen dough composition 20, the yeast-leavened microwavable dough 24, or the fresh-baked, microwavable yeast-leavened bakery product 36 as a liquid, vapor or in granular form. The form of the enzyme component that is selected preferably permits the enzyme component to remain stable prior to introduction into the dough additive 12, the unrisen dough composition 14, the microwavable unrisen dough composition 20, the yeast-leavened microwavable dough 24, the fresh-baked, microwavable, yeast-leavened bakery product 36, (2) to be homogeneously blended into the dough additive 12, the unrisen dough composition 14, the microwavable unrisen dough composition 20, the yeast-leavened microwavable dough 24 (3) to degrade the unrisen dough composition 14, the microwavable unrisen dough composition 20, the yeast-leavened microwavable dough 24, or the fresh-baked, microwavable, yeast-leavened bakery product 36, (4) to control starch recrystalization and/or moisture migration in the yeast-leavened microwavable dough 24 or the fresh-baked, microwavable, yeast-leavened bakery product 36 when included as part of the dough additive 12, the unrisen dough composition 14, the microwavable unrisen dough composition 20 the yeast-leavened microwavable dough 24, or the fresh-baked, microwavable, yeast-leavened bakery product 36, and (5) to transform the microwavable unrisen dough composition 20 and/or the yeast-leavened microwavable dough 24 into the fresh-baked, microwavable, yeast-leavened bakery product 36.

As used herein, an "enzyme" means any complex protein produced by a living cell that is capable of catalyzing a specific biochemical reaction on one or more target substrates. The term "enzyme" is also meant to encompass any complex protein capable of catalyzing the specific biochemical reaction in which the enzyme is substantially free of any microorganism. All references to "enzyme" is also understood as encompassing any synthetically-produced identical copy of the enzyme that is identical in molecular structure to the enzyme that originated in a living organism.

The enzyme component of the microwave baking dough additive 12 may be included at an amount that is effective in transforming the frozen bakery product into a fresh-baked, microwavable, yeast-leavened bakery product 36 using microwave energy, and controlling starch recrystalization or moisture migration when included as part of the dough additive 12, the unrisen dough composition 14, the microwavable unrisen dough composition 20 or the yeast-leavened microwavable dough 24. Furthermore, those of ordinary skill in the art will recognize that the amount of the enzyme component used in accordance with the present invention may be varied, depending upon the gelling component; the gum component; the unrisen dough composition 14; the conditions of the unrisen dough composition 14, such as the temperature, pH, or consistency; the liquid component; any optional additives; the particular enzymes employed; the activity of the enzymes; the amount of time required for catalysis; the desired characteristics of the microwavable unrisen dough composition 20; the fresh-baked, microwavable, yeast-leavened bakery product 36; or any combination of any of these. Consequently, the process of the present invention is not limited to any particular level or amount of the enzyme component. As one non-exhaustive example, the enzyme component may range from about 1 part enzyme component per $10^6$ parts microwavable unrisen dough composition 20 to about $10^6$ parts enzyme component per part microwavable unrisen dough composition 20.

The enzyme component of the microwave baking dough additive 12 may include a carbohydrase, a lipase, an oxidase, a protease or any combination of any of these. As used herein, a "carbohydrase" means an enzyme that is capable of hydrolyzing a glycoside linkage between a reducing functional group of a carbohydrate and a hydroxyl group of another molecule, such as another carbohydrate molecule, for example. Some non-exhaustive examples of carbohydrases that may be used in practicing the present invention include alpha-amylases; beta-amylases; amyloglucosidases; alpha-glucosidases; beta-glucosidases; pullalanases; dextranases; isoamylases; cellulases; hemicellulases, such as pentosonases or xylanases; or, any combination of any of these.

As used herein, a "protease" means an enzyme that is capable of hydrolyzing a peptide bond between an amino group of one amino acid and a carboxyl group of a next amino acid in a target substrate that includes two or more amino acids. Some non-exhaustive examples of proteases that may be used in practicing the present invention include acid proteases; aminopeptidases; carboxypeptidases; sulfhydryl proteases; alkaline proteases; serine proteases; neutral proteases; or endo and exo-proteases.

As used herein, the term "lipase" means an enzyme that is capable of hydrolyzing triglycerides and/or lipid-containing molecules to release free fatty acids, glycerol, mono-glycerides, di-glycerides, or any combination of any of these. Additionally, an oxygenase, as used herein refers to an enzyme that is capable of catalyzing the direct incorporation of oxygen into one or more target substrates. As an example, a lipoxygenase is an oxygenase that catalyzes the direct incorporation of oxygen into a lipid molecule.

Preferably, the enzyme component of the present invention includes one or more enzymes that are capable of degrading and/or modifying one or more carbohydrates. Still more preferably, the enzyme component includes one or more carbohydrases that are capable of degrading and/or modifying carbohydrates, such as starches, amylose, amylopectin, starch derivatives, such as dextrins or oligosaccharides, damaged starch granules, starch polysaccharides, non-starch polysaccharides, like xylans, xylose-containing oligosaccharides, pentosans, or any combination of any of these. Most preferably, the enzyme component includes one or more xylanases that are capable of hydrolyzing non-starch polysaccharides, such as xylans, xylose-containing oligosaccharides, pentosans, or any combination of any of these. By "xylanase" is meant one or more enzymes that hydrolyze and/or modify xylans, xylose-containing oligosaccharides, pentosans or any combination of any of these.

The enzyme component, such as the enzyme component that includes xylanase may be supplied as individual enzymes or supplied in various prepared mixtures of two or more enzymes that are subsequently combined to form the enzyme component. As an example, xylanases may be obtained from Novo Nordisk Biochem of North America located in Franklinton, N.C. or Amano Enzyme U.S.A. Co., Ltd., of Lombard, Ill. Alternatively, the enzyme component may be supplied as a naturally occurring and/or an added part of any component of the unrisen dough composition 14.

Though descriptions of the present invention are primarily made in terms of the preferred enzyme component that includes a xylanase, it is to be understood that any other enzyme that is capable of degrading and/or modifying any other component of the unrisen dough composition 14, the microwavable unrisen dough composition 20, the yeast-leavened microwavable dough 24, such as alpha-amylases, beta-amylases, amyloglucosidases, alpha-glucosidases, beta-glucosidases, pullalanases, dextranases, isoamylases, cellulases, acid proteases, aminopeptidases, carboxypeptidases, sulfhydryl proteases, alkaline proteases, serine proteases, neutral proteases, endo or exo-proteases, lipoxygenases or lipases may be substituted in place of the xylanase while still realizing the benefits of the present invention. Likewise, it is to be understood that any combination of a xylanase enzyme and any other enzyme may be used in accordance with the present invention, while still realizing the benefits of the present invention.

For example, an enzyme component that includes a carbohydrase that is capable of degrading and/or modifying any starch fractions of the unrisen dough composition 14 may be effective in controlling moisture migration and/or starch recrystallization when practicing the present invention since the starch fraction generally absorbs moisture and contributes to the structure of the unrisen dough composition 14. As another example, an enzyme component that includes a protease that is capable of degrading and/or modifying any protein fractions of the unrisen dough composition 14 may also be effective in transforming the yeast-leavened microwavable dough 24 into the fresh-baked, microwavable, yeast-leavened, bakery product 36 when practicing the present invention since the protein fraction generally absorbs moisture and contributes to the texture of the fresh-baked, yeast-leavened microwavable bakery product.

Similarly, an enzyme component that includes a lipase that is capable of degrading and/or modifying any fat and/or lipid containing fractions of the unrisen dough composition 14 maybe effective in controlling starch recrystallization when practicing the present invention since the fat fraction generally increases the tenderness, volume and aids in expansion of the unrisen dough composition 14 or microwavable unrisen dough composition 20 during leavening. Likewise, an enzyme component that includes an oxidase and/or a reductase that is capable of degrading and/or modifying any fraction of the unrisen dough composition by strengthening or softening the microwavable unrisen dough composition 20 consistency may be effective in forming a fresh-baked yeast-leavened microwavable bakery product after baking via application of microwave energy since an oxidase and/or a reductase may modify the microwavable unrisen dough composition 20 and permit control of moisture migration and/or starch recrystallization.

When the microwave baking dough additive 12 that includes the gelling component, the gum component and the enzyme component is homogeneously blended into the unrisen dough composition 14, a gluten matrix, a gluten-gel matrix, or any combination of any of these, in addition to the gel matrix between the gelling component and the gum component may be formed as part of the microwavable unrisen dough composition 20 in the dough-forming apparatus 16. By "gel matrix" is meant a continuous three-dimensional network of one or more polymers that entraps, binds or retains one or more liquids. As used herein, a "gluten matrix" refers to an extensive three-dimensional network of hydrated proteins and starches that may be formed when hydrated flour particles are manipulated in the dough-forming apparatus 16. Furthermore, a "gluten-gel matrix" refers to the three-dimensional network that may be formed when the microwave baking dough additive 12 is homogeneously blended into the unrisen dough composition 14.

While both the gel matrix and the gluten matrix are each capable of providing a structural network within the microwavable unrisen dough composition 20, the gluten-gel matrix may also provide a structural network to the microwavable unrisen dough composition 20. Such structural reinforcement by the gluten matrix, the gluten-gel matrix, the gel matrix, or any combination of any of these, in the microwavable dough composition 60 efficiently binds water, prevents and controls moisture migration and/or starch recrystallization during the application of microwave energy in accordance with the present invention. Additionally, the gluten matrix, the gluten-gel matrix, or the gel matrix also facilitates transformation of a frozen bakery product that includes the dough additive 12 into the fresh-baked, microwavable, yeast-leavened bakery product 36 through application of microwave energy.

The microwave baking dough additive 12 may be based on a concentrate or as part of a composition. The microwave baking dough additive concentrate, hereinafter referred to as "the additive concentrate" generally includes the gelling component, the gum component, the enzyme component, or any combination of any of these. An example of component concentration ranges for a preferred formulation of the additive concentrate is presented in Table 1 below:

TABLE 1

| COMPONENTS | CONCENTRATION (weight percent)* |
|---|---|
| Gelling Component | about 30 to about 50 |
| Gum Component | about 45 to about 65 |
| Enzyme Component | less than about 10 |

*Based on the total dry weight of the microwave baking dough additive concentrate.

The microwave baking dough additive 12 may also be based on a microwave baking dough additive composition, hereinafter referred to as the "additive composition." The benefits of delivering the dough additive 12 as part of an additive composition includes savings in preparation time and/or labor costs during production, rapid and/or consistent preparation of a variety of microwavable yeast-leavened bakery products, reduced inventory costs, rapid and/or consistent baking of frozen microwavable yeast-leavened bakery products via application of microwave to form fresh-baked, microwavable, yeast-leavened bakery products 36. Alternatively, the additive composition that does not include the dough additive 12 may be included either before or after the dough additive 12 is added when practicing the present invention.

The additive composition may be blended into the dough additive 12, the unrisen dough composition 14, the microwavable unrisen dough composition 20, the yeast-leavened microwavable dough 24 or the fresh-baked, microwavable, yeast-leavened bakery product 36 as a liquid, vapor, spray or in granular form. The form of the additive composition that is selected preferably permits the additive composition to remain stable prior to introduction into the dough additive 12, the unrisen dough composition 14, the microwavable unrisen dough composition 20, the yeast-leavened microwavable dough 24 or the fresh-baked, microwavable, yeast-leavened bakery product 36, (2) to be homogeneously blended into the dough additive 12, the unrisen dough composition 14, the microwavable unrisen dough composition 20, the yeast-leavened microwavable dough 24, and (3) to transform the microwavable unrisen dough composition 20 and/or the yeast-leavened microwavable dough 24 into the fresh-baked microwavable yeast-leavened bakery product 36.

The additive composition may be included at an amount that is effective in transforming the yeast-leavened microwavable dough 24 into a fresh-baked, microwavable, yeast leavened bakery product 36, or controlling starch recrystallization or moisture migration when used in accordance with the present invention. Furthermore, those of ordinary skill in the art will recognize that the amount of each portion of the additive composition and the amount of the additive composition may be varied depending upon each component of the additive composition, the unrisen dough composition 14, the microwavable unrisen dough composition 20, the yeast-leavened microwavable dough 24, dough-forming conditions, pH, temperatures, or consistency in the unrisen dough composition 14, the microwavable unrisen dough composition 20, the yeast-leavened microwavable dough 24, the desired characteristics of the microwavable unrisen dough composition 20 or the fresh-baked microwavable yeast-leavened bakery product 36, or any combination of any of these. Consequently, the process of the present invention is not limited to any particular level of amount of the additive composition. As one non-exhaustive example, the additive composition may range up to about 50 parts additive composition per 100 parts flour component of the unrisen dough composition 14.

The additive composition may optionally include a flour portion, a non-starch polysaccharide portion, a fat portion, a protein portion, optional additives, or any combination of any of these, in combination with the gelling component, the gum component, and the enzyme component. The portions of the additive composition may be supplied as individual components, or supplied in various prepared mixtures of two or more components, that are subsequently combined to form the additive composition.

The optional flour portion of the additive composition may include one or more flours in an amount that is effective to absorb water, provide structure to the microwavable unrisen dough composition 20, the yeast-leavened microwavable dough 24 or the fresh-baked, microwavable, yeast-leavened bakery product 36, contribute non-starch polysaccharides like xylans, xylose-containing oligosaccharides, pentosans for degradation by the enzyme component, and/or support expansion of the microwavable unrisen dough composition 20 and/or the yeast-leavened microwavable dough 24. The optional flour portion may be supplied as individual flours or supplied in various preparations of two or more flours that are subsequently combined to form the flour portion of the additive composition. Some non-exhaustive examples of suitable flours that may be incorporated in the unrisen dough composition 14 include malt flour, wheat flour, gluten, potato flour, cracked wheat, rye flour, buckwheat flour, triticale flour, rice flour, amaranth flour, whole wheat flour, bread flour, all-purpose flour, pastry flour, cake flour, instantized flour, soy flour, corn flour, or cornmeal, or any combination of any of these. As one non-exhaustive example, gluten may be the flour portion of an additive composition used to produce a fresh-baked, yeast-leavened microwavable cinnamon roll, while enriched bread flour may be the flour portion of an additive composition used to produce a fresh-baked pizza dough in accordance with the invention.

The optional non-starch polysaccharide portion of the additive composition may include one or more non-starch polysaccharides in an amount that is effective to entrap and prevent water molecules from moving, particularly during the application of microwave energy. The optional non-starch polysaccharide portion may be supplied as individual non-starch polysaccharides or supplied in various prepared mixtures of two or more non-starch polysaccharides that are subsequently combined to form the non-starch polysaccharide portion.

Some non-exhaustive examples of non-starch polysaccharides may include the above-mentioned xylans, xylose-containing oligosaccharides, or pentosans; cellobiose, cellulose, or any combination thereof. As used herein, the term "xylans" refers to complex carbohydrate polymers built from one or more D-xylose monomers. Furthermore, the term "pentosans" refers to any group of carbohydrates found with cellulose in plants that typically yield pentoses or 5-carbon sugars on hydrolysis. In addition, the term "cellulose" refers to any complex polysaccharides built from cellobiose, or 4-0-β-D-glucopyranosyl-D-glucose subunits. As an example, the non-starch polysaccharide may include cellulose, such as cellulose that is available as Solka Floc®, from Fiber Sales & Development Corporation located in Urbana, Ohio or as Cellogen®, from Multi-Kem Corporation of Ridgefield, N.J.

The optional fat portion of the additive composition may include one or more fats and/or lipid-containing molecules in an amount that is effective to tenderize the microwavable unrisen dough composition 20, or assist in homogeneously blending the microwavable unrisen dough composition 20 in the dough-forming apparatus 16. The optional fat portion may be supplied as individual fats or supplied in various prepared mixtures of two or more fats and/or lipid-containing molecules that are subsequently combined to form the fat portion. Some non-exhaustive examples of fats include oils such as sunflower oil, soybean oil, cottonseed oil, peanut oil, corn oil, olive oil, palm oil, canola oil; shortening, such as margarine or Crisco™; lard, hydrogenated fats, butter, cocoa butter or synthetic fat substitutes, such as sucrose polyesters. As one non-exhaustive example, shortening may be used to prepare the additive composition in accordance with the present invention.

The optional protein component in the additive composition may include one or more proteins in an amount that is effective to bind water to control moisture migration and/or prevent starch recrystallization. The optional protein component may include one or more proteins derived from animal sources, plant sources or any combination of animal sources and plant sources. Some non-exhaustive examples of suitable animal-derived protein components that may be incorporated in the additive composition include eggs or portions thereof, such as frozen eggs, liquid eggs, egg yolks, whole eggs, egg whites, dried eggs, pasteurized eggs, imitation eggs that are made from milk solids or soy protein, or any combination thereof; dairy proteins, such as whey, whey protein, whey protein concentrate, whey permeate, de-lactosed whey, or casein; fish meal, such as fish protein meals; animal fluids, such as blood; microbial biomass, such as single-cell protein; and any of these in any combination.

Some non-exhaustive examples of suitable plant-derived protein components that may be incorporated in the additive composition includes soy protein flour, soy protein isolates, soy protein concentrates, rapeseed protein flour, sunflower protein flour, wheat protein flour, peanut protein flour; vegetable protein flour such as potato protein flour; and any of these in any combination. The optional protein portion may be supplied as individual proteins or supplied in various prepared mixtures of two or more proteins that are subsequently combined to form the fat portion. As an example, soy protein isolate that is available from Protein Technologies, Inc. of St. Louis, Mo. may be included as part of the additive composition.

Some non-exhaustive examples of suitable optional additives that may be incorporated in the microwave baking dough additive 20 include emulsifiers such as mono- and di-glycerides; saturated mono and di-glycerides; sodium- and calcium stearoyl lactylate (SSL and CSL); ethoxylated-mono- and di-glycerides (EMG); polysorbates (PS); lecithin; succinylated monoglycerides (SMG); diacetyl tartaric acid esters of mono-glycerides (DATEM); lactic acid esters, propylene glycol esters; polyglycerol esters; polyglycerol; stabilizers; sweeteners, such as fructose, glucose, invert sugar like Drivert, sucrose, corn syrup, high fructose corn syrup; acidulants, such as lactic acid, acetic acid, citric acid, malic acid; leavening agents, such as air, carbon dioxide, baking soda, baking powder like monocalcium phosphate, sodium acid pyrophosphate or sodium aluminum phosphate. In addition, flavoring agents, such as vanilla, almond, cinnamon, nutmeg, spices, herbs, savory or fruity flavors; salt or salt buffers; or any combination of any of these, may also be used to flavor the unrisen dough composition 14.

An example of component concentration ranges for a preferred formulation of a dough additive composition is presented in Table 2 below:

TABLE 2

| COMPONENT | CONCENTRATION (weight percent)* |
|---|---|
| Gelling component | about 1 to about 75 |
| Gum component | about 1 to about 75 |
| Enzyme component | about $10^{-6}$ to about 25 |
| Flour portion | 0 to about 40 |
| Non-starch polysaccharide portion | 0 to about 25 |
| Fat portion | 0 to about 25 |
| Protein portion | 0 to about 40 |
| Optional additives | 0 to about 90 |

*Based on the total dry weight of the additive composition.

As mentioned above, the fresh-baked, microwavable, yeast-leavened bakery product 36 is prepared from the unrisen dough composition 14. The unrisen dough composition 14, and therefore any component of the unrisen dough composition 14 may be blended into the dough additive 12 or the microwavable unrisen dough composition 20 as a liquid, such as a batter, vapor, spray or in granular form. The form of the unrisen dough composition 14 that is selected preferably permits the unrisen dough composition 14 to (1) to remain stable and/or active prior to introduction into the dough additive 12 or the microwavable unrisen dough composition 20, (2) to be homogeneously blended into the dough additive 12, the microwavable unrisen dough composition 20 or the microwavable yeast-leavened dough 120, (3) to develop the gluten gel and/or the gluten-gel matrix that enables transformation of a frozen, refrigerated, or fresh microwavable yeast-leavened dough into a fresh-baked, microwavable, yeast-leavened bakery product 36 via application of microwave energy, and (4) to form a dough composition that is extensible, and thus, capable of stretching when pulled, elastic and therefore, capable of retaining gases produced during fermentation, strong, and ultimately, stable enough to maintain the desired shape and cell structure, depending upon the characteristics of the fresh-baked, microwavable yeast-leavened bakery product 36.

Furthermore, each component of the unrisen dough composition is preferably capable of developing desired characteristics in the microwavable unrisen dough composition 20 in temperatures ranging from about −100° F. to about 500° F. A temperature range of about −100° F. to about 50° F. may encompass suitable freezing and/or refrigerator conditions that are used in accordance with the present invention while a temperature range of about 200° F. to about 500° F. may encompass suitable baking conditions used in accordance with the present invention.

Additionally, those or ordinary skill in the art will recognize that the amount of each component of the unrisen dough composition 14, and therefore, the amount of the unrisen dough composition 14 may vary depending upon each component of the unrisen dough composition 14, the dough additive 12, the microwavable unrisen dough composition 20 or the yeast-leavened microwavable dough 24, dough-forming conditions like temperature or humidity; pH, temperatures, desired elasticity, extensibility or consistency of the microwavable unrisen dough composition 20; the fresh-baked, microwavable, yeast-leavened bakery product 300; or any combination of any of these. Consequently, the process of the present invention is not limited to any particular level of amount of each component of the unrisen dough composition 14, nor an amount of the unrisen dough composition 14. As one non-exhaustive example, the unrisen dough composition 14 may range up to about $10^4$ parts unrisen dough composition 14 per part dough additive 12.

As stated above, the unrisen dough composition 14 may include a flour component, a yeast component, optional additives or any combination of any of these. Additionally, the flour component may contain a starch fraction, a non-starch polysaccharide fraction, a protein fraction, a fat fraction, an enzyme fraction, optional ingredients, such as vitamins, minerals,or any combination of any of these. The flour component may be supplied as individual fractions or supplied in various prepared fractions that are subsequently combined to form the flour component of the unrisen dough composition 14.

The starch fraction of the flour component that generally includes amylose, amylopectin, starch derivatives, such as dextrins or oligosaccharides, damaged starch granules, or any combination of any of these may be capable of absorbing water, contributing to the structural framework of the unrisen dough composition 14 or the microwavable unrisen dough composition 20, or be susceptible to degradation and/or modification by the enzyme fraction of the flour portion or the enzyme component of the dough additive 12 in accordance with the present invention.

Similarly, the non-starch polysaccharide fraction of the flour component that may include xylans, xylose-containing oligosaccharides, pentosans, cellulose, cellobiose, or any combination of any of these may be capable of absorbing water, contributing to the structural framework of the unrisen dough composition or be susceptible to degradation and/or attack by the enzyme fraction of the flour component or the enzyme component when practicing the present invention. Additionally, the non-starch polysaccharide fraction may compete for liquid, such as water with the starch and/or the protein fractions to prevent the starch and/or the protein fractions from swelling and proper gelatinization.

The protein fraction of the flour component generally includes gliadins, glutenins, small peptides, albumins, globulins, or any combination of any of these. The protein fraction of the flour component may be capable of absorbing water, providing structure to the unrisen dough composition 14 or the microwavable unrisen dough composition 20, or be susceptible to degradation and/or modification by the enzyme fraction of the flour component or the enzyme component of the dough additive component 20 when practicing the present invention.

The fat fraction of the flour component that generally includes saturated, mono-unsaturated and polyunsaturated fats along with other fat and/or lipid-containing molecules may be capable of increasing the tenderness, volume and aiding in expansion of the unrisen dough composition 14 or microwavable unrisen dough composition 20 during leavening. The flour component may also include ingredients, such as vitamins, minerals, sugars or any combination of any of these. Such additional ingredients maybe effective in assisting yeast fermentation during leavening, strengthening the structural framework of the unrisen dough composition 14 or the microwavable unrisen dough composition 20, absorbing any liquid components or contributing to the overall product characteristics of the fresh-baked, microwavable, yeast-leavened bakery product 36.

The flour component of the unrisen dough composition 14 may also include an enzyme fraction, that contains one or more enzymes that are capable of degrading and/or modifying the flour component, the yeast component, the liquid component or optional additives of the unrisen dough composition 14. The enzyme fraction may include the above-mentioned carbohydrases, such as alpha-amylase, beta-amylase, or amyloglucosidase, lipases, proteases, lipoxygenase,-cellulases, hemicellulases, like xylanase, pentosanase, or any combination of any of these. The enzyme fraction of the flour component may be capable of releasing liquid components like water by hydrolyzing the starch fraction, the non-starch polysaccharide fraction, and/or the protein fraction; forming sugars that may function as food for yeast during leavening; modifying the consistency of the unrisen dough composition 14 or the microwavable unrisen dough composition 20 by hydrolyzing the starch fraction, the protein fraction, fat and/or lipid containing molecules, the non-starch polysaccharide fractions, or any combination of any of these in the unrisen dough composition 14 or the microwavable unrisen dough composition 20 when practicing the present invention.

Some non-exhaustive examples of suitable flours may include the above-mentioned malt flour, wheat flour, gluten, potato flour, cracked wheat, rye flour, buckwheat flour, triticale flour, rice flour, amaranth flour, whole wheat flour, bread flour, all-purpose flour, pastry flour, cake flour, instantized flour, soy flour, corn flour, or cornmeal, or any combination of any of these. As an example, patent bread flour that is available from Cargill, Inc., of Minnetonka, Minn. may be used as the flour component when practicing the present invention.

As stated above, the unrisen dough composition 14 typically includes a yeast component. The yeast component of the unrisen dough composition 14 may be blended into the dough additive 12, the unrisen dough composition 14, or the microwavable unrisen dough composition 20 as a liquid, vapor, granular or in a compressed form. The form of the yeast component that is selected preferably permits the yeast component (1) to remain stable prior to introduction into the dough additive 12, the unrisen dough composition 14, or the microwavable unrisen dough composition 20, (2) to remain active after introduction into the dough additive 12, the unrisen dough composition 14, or the microwavable unrisen dough composition 20, (3) to be homogeneously blended into the dough additive 12, the unrisen dough composition 14, or the microwavable unrisen dough composition 20, (4) to leaven the dough additive 20, the unrisen dough composition 14, and/or the microwavable unrisen dough composition 20 by producing carbon dioxide, ethanol, dough conditioners, flavor compounds, or any combination of any of these, and (5) to retain leavening activity in a frozen and/or a refrigerated microwavable unrisen dough composition that enables transformation of the frozen and/or the refrigerated microwavable unrisen dough composition into the fresh-baked, microwavable, yeast-leavened bakery product 36.

Those of ordinary skill in the art may also vary the amount of the yeast component based upon the desired characteristics of the unrisen dough composition 14, the microwavable unrisen dough composition 20, the yeast-leavened, microwavable dough 24 or the fresh-baked, microwavable, yeast-leavened bakery product 36; each component of the unrisen dough composition 14 or the amount of the unrisen dough composition 14; sugars, pH, salt buffers; the dough-forming apparatus 16, the proofing apparatus 22, the microwaving apparatus 34, the type and/or activity of yeast; the presence of any anti-microbial agents; or any combination of any of these. Consequently, the amount of the yeast component may be any amount that provides a desired degree of leavening to the fresh-baked, microwavable, yeast-leavened bakery product 36.

The yeast component may be supplied as a yeast concentrate or as part of a yeast composition. The yeast concentrate may include one or more yeast cultures or may optionally include additional components, such as yeast salts like calcium sulfate, yeast foods such as sucrose, maltose, dextrose, fructose, glucose, fermentation accelerators, such as ammonium sulfate or ammonium chloride or any other components that are compatible with, and that do not interfere with the leavening activity of the yeast.

The yeast component may also be included as part of a yeast composition and may contain one or more yeast cultures along with flour, liquids, water, organic acids like acetic, oxalic, malic, succinic, and/or citric acids. The benefits of delivering the yeast component as part of a yeast composition include improved leavening activity, improved flavor development, improved textural characteristics, increased dough extensibility, or any combination of any of these. Some non-exhaustive examples of yeast concentrates that may be used in accordance with the present invention include cultures of *Saccharomyces cerevisiae, Pediococcus acidilacti, Pediococcus pentasaceus, Lactobacillus plantarum, Lactobacillus brevis,* any other lactic acid bacteria, or any combination of any of these.

Some non-exhaustive examples of yeast compositions includes fresh yeasts like cream yeast culture, cake yeast culture, starter yeast culture, sponge yeast culture or any combination thereof, dry yeasts, such as active dry yeast (ADY), protected dry yeast (PADY), instant dry yeast (IDY), or any combination of any of these. As an example, yeast that is available from Fleischmann's® Yeast® of Fenton, Mo. may be used as the yeast component when preparing a fresh-baked, microwavable yeast-leavened pizza dough.

Though descriptions of the present invention are primarily made in terms of a yeast component that is capable of leavening the microwavable unrisen dough composition 20, it is to be understood that any other leavening agent that is capable of leavening the microwavable unrisen dough composition 20, such as baking soda, baking powder, air, steam, carbon dioxide, nitrogen gas, oxygen gas, any other food-grade gases, or any combination of any of these, may be substituted in place of the yeast component, while still realizing the benefits of the present invention. Likewise, it is to be understood that any combination of the yeast component and any combination of a non-yeast component like baking soda, baking powder, air, steam, carbon dioxide, ethanol, nitrogen gas, oxygen gas, any other food-grade gases, or any combination of any of these may be included in accordance with the present invention while still realizing the benefits of the present invention.

The unrisen dough composition 14 may optionally include salt, to add flavor to the fresh-baked, microwavable, yeast-leavened bakery product, sugars to assist in rapid growth of the yeast component, fats and/or lipid-containing molecules to increase the tenderness of, and to aid in browning of the crust and/or of the crumb of the fresh-baked, microwavable, yeast-leavened bakery product, dough conditioners that may include emulsifiers, oxidizing agents such as ascorbic acid, potassium iodate, potassium bromate, calcium iodate, calcium bromate, azodicarbomaide (ADA) or any combination of any of these; reducing agents like L-cysteine that promotes softening of, increased dough flow for and/or reduced mixing times for the microwavable unrisen dough composition 20 or the yeast-leavened microwavable dough 24; acidulants and/or buffers to regulate the pH of the unrisen dough composition 14, microwavable unrisen dough composition 20, or the yeast-leavened microwavable dough 24; antioxidants, such as Vitamin E; non-fat dried milk, mold inhibitors, coloring agents, synthetic antioxidants like butylated hydroxy anisole (BHA) and butylated hydroxy toluene (BHT); or any combination of any of these.

The microwave baking dough additive 12, the unrisen dough composition 14 and optional liquid components 18 are homogeneously blended in the dough-forming apparatus 16. Preferably, the dough-forming apparatus 16 that is used to practice the present invention is effective (1) to mix, stir, knead, mechanically-handle, manipulate or beat the microwavable baking dough additive 12, the unrisen dough composition 14 and/or any optional liquid components 18, (2) to facilitate hydration of each component of the dough additive 20, the unrisen dough composition 30 or the microwavable unrisen dough composition 20, (3) to develop the structure of the microwavable unrisen dough composition 20, (4), to develop the gluten matrix, the gluten-gel matrix, and/or the gel matrix in the microwavable unrisen dough composition 20 that enables transformation of a frozen, refrigerated, or fresh microwavable unrisen dough composition into the fresh-baked, microwavable, yeast-leavened bakery product 36 via application of microwave energy, (5), to incorporate air or any food grade gas into the microwavable unrisen dough composition 20, and (6) to form a microwavable unrisen dough composition that is extensible, and thus, capable of stretching when pulled, elastic, and therefore capable of retaining gases produced during fermentation, malleable and/or non-sticking.

Furthermore, those of ordinary skill in the art will recognize that the amount of time and degree of agitation that is used to form the microwavable unrisen dough composition 20 in accordance with the present invention may vary depending the dough additive 12, the unrisen dough composition 14, the microwavable unrisen dough composition, the fresh-baked, microwavable, yeast-leavened bakery product 36, dough-forming apparatus conditions, like the temperature, pH, or humidity; or any combination of any of these. As a result, the amount of time and degree of agitation is not limited to any particular level. A suitable example of a dough-forming apparatus that may be used to practice the present invention is the HF 190 Spiral Mixer that is available from Hobart Corporation of Toledo, Ohio.

The liquid components 18 may be blended into the dough additive 12, the unrisen dough composition 14, the microwavable unrisen dough composition 20, or the yeast-leavened microwavable dough 24 as a liquid, spray, or in syrup form. The liquid component 18 is included at an amount that is effective to (1) homogeneously blend the dough additive 12, the unrisen dough composition 14 or the microwavable unrisen dough composition 20, (2) to develop the gluten, gel and/or the gluten-gel matrix that enables transformation of a frozen, refrigerated, or fresh microwavable yeast-leavened dough into a fresh-baked, microwavable, yeast-leavened bakery product 36 via application of microwave energy, (3) to form a microwavable unrisen dough composition that is extensible, and thus, capable of stretching when pulled, elastic and therefore, capable of retaining gases produced during fermentation, strong, and ultimately, stable enough to maintain the desired shape and cell structure, depending upon the characteristics of the fresh-baked, microwavable yeast-leavened bakery product 36, and (4) to facilitate leavening activity by the yeast component. Consequently, the present invention is not limited to an amount of the liquid component.

While the amount of liquid component 18 that is included in the microwavable unrisen dough composition may vary, the temperature of the liquid component, and therefore, the temperature of the microwavable unrisen dough composition 20 is an important factor in forming desired characteristics in the microwavable unrisen dough composition 20 and the yeast-leavened, microwavable dough 24. The temperature of the microwavable unrisen dough composition 20 may range from about 65° F. to about 80° F. when practicing the present invention. Preferably, the temperature of the microwavable unrisen dough composition ranges from about 70° F. to 78° F. to prevent any reduction in leavening activity by the yeast component. Still more preferably, the temperature of the microwavable unrisen dough composition ranges from about 72° F. to 76° F. to facilitate homogenous blending of the dough additive 12, the unrisen dough composition 14 and the microwavable unrisen dough composition 20.

Some non-exhaustive examples of suitable liquid components that may be incorporated into the present invention include water, evaporated milk, skim milk, whole milk, soured milk, buttermilk, fruit juice, fruit pulp, honey, high fructose corn syrup, corn syrup, maple syrup, any liquid portion of the dough additive 12 or the unrisen dough composition 14. As an example, liquid water may be used as the liquid component when practicing the present invention.

After forming, the microwavable unrisen dough composition 20 is fermented for a time and temperature that is effective (1) to support growth of the yeast component, (2) to leaven the microwavable unrisen dough composition 20, (3) to increase the volume and/or size of the microwavable unrisen dough composition 20, (4) to increase the size of any air cells of the microwavable unrisen dough composition 20, (5) to generate or distribute leavening components, such as carbon dioxide, ethanol, organic acids, flavor components, or any combination of any of these within the yeast-leavened, microwavable dough 24, and (6) to attain and maintain a desired grain and/or crumb structure of the yeast-leavened, microwavable dough 24 or the fresh-baked, microwavable, yeast-leavened bakery product 36.

The microwavable unrisen dough composition 20 may be fermented during transport to, within, and/or transport from the proofing apparatus 22. Furthermore, those of ordinary skill in the art may vary the fermentation process depending upon the yeast component, sugars, pH, salt, each component of the microwavable unrisen dough composition 20 or the fresh-baked, microwavable, yeast-leavened bakery product 36. For example, the fermentation process may proceed for at least about 15 minutes at a temperature of more than about 100° F. and a humidity level of more than 10%. In another example, when the microwavable unrisen dough composition 20 is a pizza dough, the microwavable unrisen dough composition 20 may be proofed for about 30 minutes to about 2 hours at about 100° F. to about 120° F. and about 20% to about 50% humidity. Similarly, when the microwavable unrisen dough composition 20 is a microwavable cinnamon roll, the microwavable unrisen dough composition 20 may be fermented for at least about 10 minutes, at a temperature of about 70° F. to about 80° F. and about 30% humidity.

Figure 2:
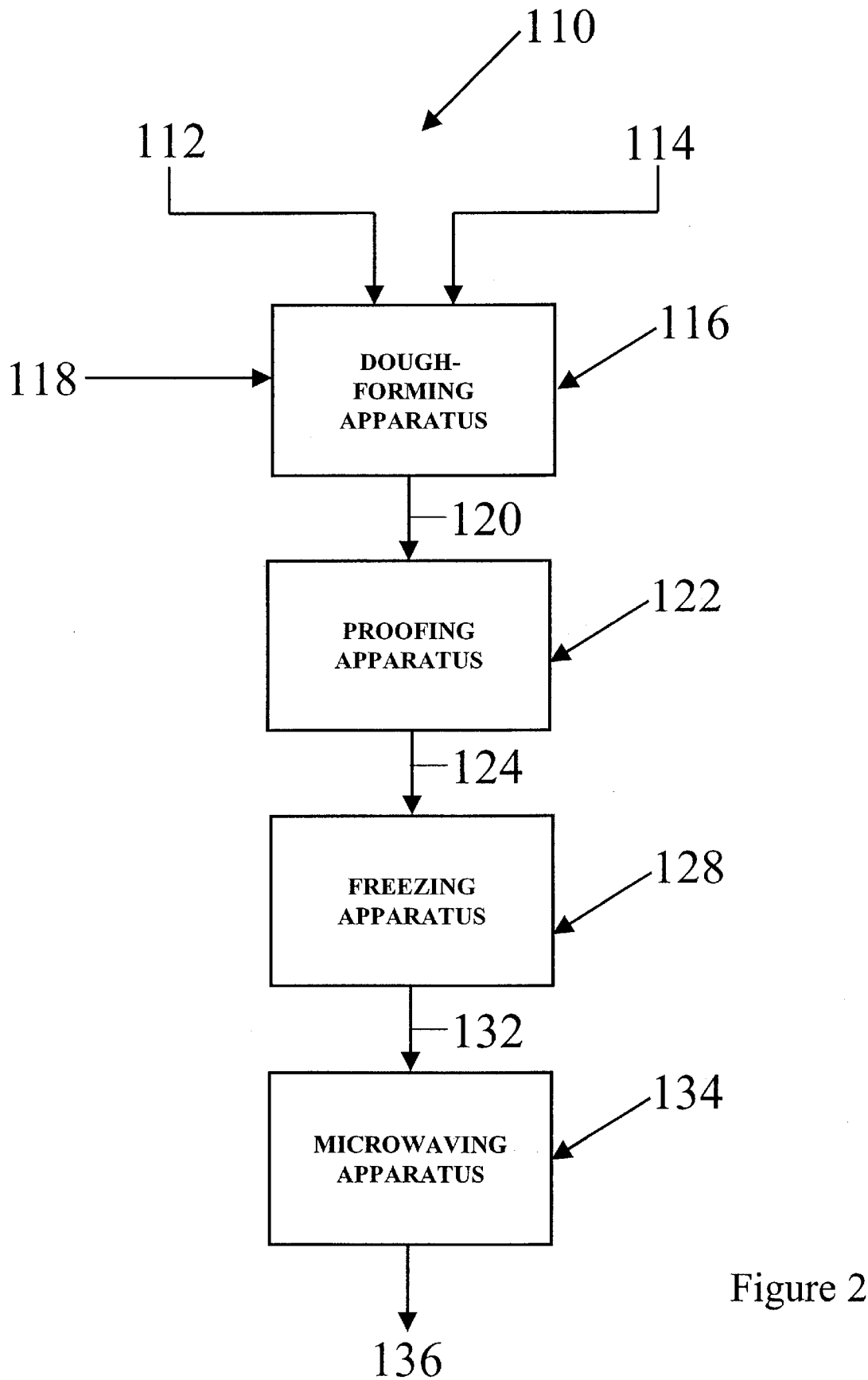
FIG. 2 is another schematic of a process for producing a microwavable yeast-leavened bakery product in accordance with the present invention.
Figure 3:
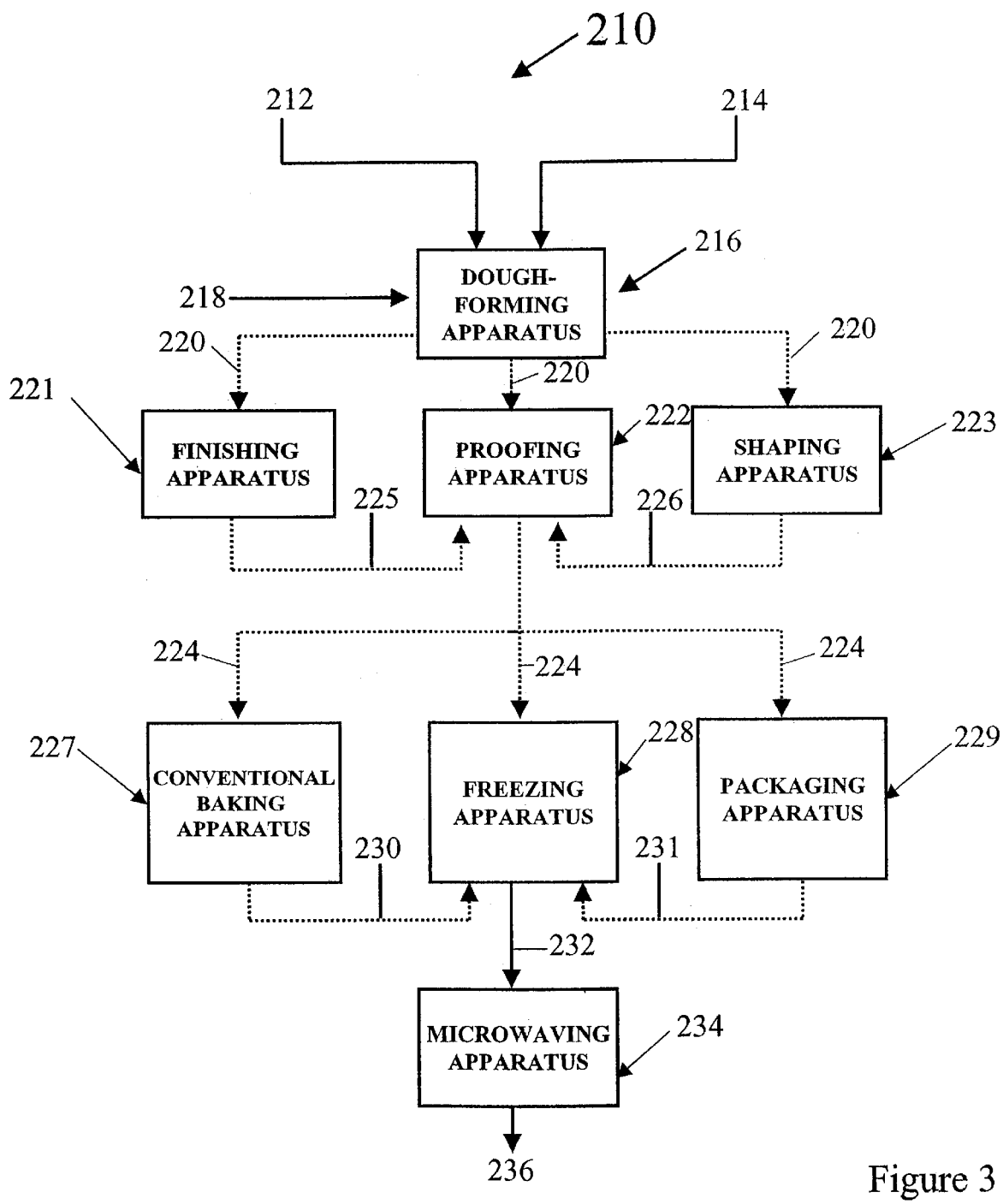
FIG. 3 is another schematic of a process for producing a microwavable yeast-leavened bakery product in accordance with the present invention.

In general, any conventional apparatus and technique that is suitable for transferring and proofing the microwavable unrisen dough composition 20 may be used to transfer and proof the microwavable unrisen dough composition 20 in accordance with the present invention. In fact, while the proofing apparatus is depicted in FIGS. 1–3 as a preferred destination to form the yeast-leavened microwavable dough 24, the proofing apparatus 22 is not critical to the present invention. Nonetheless, some non-exhaustive examples of suitable proofing apparatuses include the PEQ Series Proofers or the AHP Series Roll in Proofers that are available from Hobart Corporation of Toledo, Ohio.

After fermenting, the yeast-leavened microwavable dough 24 is baked by application of microwave energy to form the fresh-baked, microwavable yeast-leavened bakery product 36. In general, any conventional microwaving apparatus 34 that is capable of generating microwave energy for cooking a food may be suitable for use in baking the yeast-leavened microwavable dough 24 to generate the fresh-baked, microwavable yeast-leavened bakery product 36.

Preferably, the microwave energy that is used to bake the yeast-leavened microwavable dough 24 preferably is effective (1) to rapidly heat the microwavable yeast-leavened dough 24 or the fresh-baked, microwavable yeast-leavened bakery product 36, (2) to not overheat the yeast-leavened microwavable dough 24 or the fresh-baked yeast-leavened microwavable bakery product 36, (3) to evenly heat the microwavable yeast-leavened dough 24 or the fresh-baked microwavable yeast-leavened bakery product 36, and (4) to transform a frozen and/or refrigerated yeast-leavened microwavable dough into the fresh-baked, microwavable, yeast-leavened bakery product 36.

Furthermore, those of ordinary skill in the art will recognize that the microwave energy used for baking in accordance with the present invention may be varied, depending upon the yeast-leavened microwavable dough 24 or the desired characteristics of the fresh-baked, microwavable, yeast-leavened bakery product 36; the size or output power range of the microwaving apparatus 34, a location of the power output within the microwaving apparatus 34 or any devices that are used to uniformly distribute the power, such as mode stirrers, waveguides or turntables; duty cycles; any packaging material like susceptor plates; or any combination of any of these. Therefore, the microwave energy that is used to bake the yeast-leavened microwavable dough 24 may be any combination of power output and time that provides the desired characteristics of the fresh-baked, microwavable, yeast-leavened bakery product 36. As a non-exhaustive example, the yeast-leavened microwavable dough 24 may be microwaved for about 15 seconds to about 5 minutes. Preferably, the yeast-leavened microwavable dough 24 is microwaved for about 15 seconds to about 145 seconds. A suitable example of a microwaving apparatus 34 is the Sanyo Microwave Super Show-Ware Microwave that is available from Sanyo North America Corporation in San Diego, Calif.

The fresh-baked, microwavable, yeast-leavened bakery products that are prepared in accordance with the present invention yield a number of different benefits. For example, incorporating the microwave baking dough additive 12 in accordance with the present invention initially eliminates rapid toughening and/or staling that occurs during and/or after application of microwave energy when baking yeast-leavened bakery products. Furthermore, fresh-baked, microwavable yeast-leavened bakery products, like pizza crusts or microwavable cinnamon rolls that include the dough additive 12 display little, if any textural variations like gumminess, toughness, chewiness even after about 30 minutes from the time of microwave baking.

The elimination of most, if not all toughening and/or staling in fresh-baked microwavable yeast-leavened bakery products greatly increases profitability of these bakery products to the bakers and/or food manufacturers since bakers and/or food manufacturers would typically have to discard any fresh-baked microwavable yeast-leavened bakery products once they become hard, tough, soggy or caused consumers to experience difficulty during consumption.

Bakers and/or food manufacturers alike may also benefit from an increase in tolerance of yeast-leavened bakery products baked by microwave energy due to the incorporation of the dough additive 12 since fresh-baked microwavable yeast-leavened bakery products 36 prepared in accordance with the present invention maintain the fresh-baked taste experience in which there is little, if any textural variations over a substantial amount of time, such as after more than about 30 minutes.

Additionally, when a fresh-baked, microwavable yeast-leavened bakery product 36 is prepared in accordance with the present invention, no other negative defects, such as large gaping holes in the crumb and/or crust, flavor variations, liquid migration like pizza sauce migration in a pizza is being prepared, uneven color distribution and even warmed-over flavors that typically exist in yeast-leavened bakery products subjected to microwave baking are not observed in the present invention. Furthermore, such negative defects do not occur over a substantial time.

Besides eliminating most, if not all textural variations in fresh-baked, microwavable yeast-leavened bakery products that include the dough additive 12, the process of the present invention also presents no unique handling adjustments, such as additional liquid requirements, a sticky dough consistency, non-homogenous blending of components or unique fermentation requirements.

Thus, several major beneficial aspects of the process of the present invention including eliminating most, if not all toughening and/or staling in yeast-leavened bakery product during and/or after microwave baking, maintaining a fresh-baked taste experience with substantially no textural variations over time, permitting additional microwaving of the fresh-baked, microwavable yeast-leavened bakery product without any changes in texture, and reducing preparation time by microwave baking a fresh-baked yeast-leavened bakery product with little, if any product differences between a freshly prepared, conventionally oven-baked yeast-leavened bakery product and the fresh-baked, microwavable, yeast-leavened bakery product 36 offer tremendous advantages to food manufacturers and/or bakers.

In an alternate embodiment, fresh-baked, microwavable, yeast-leavened bakery products may be prepared in accordance with the present invention generally depicted at 110 in FIG. 2. Throughout the drawings, like elements are referred to using like reference characters. In the process 110, a microwave baking dough additive 112 and an unrisen dough composition 114 are introduced into a dough-forming apparatus 116 to homogeneously blend the microwave baking dough additive 112 into the unrisen dough composition 114. The dough-forming apparatus 116 homogeneously blends the dough additive 112, the unrisen dough composition 114 and any optional liquid components 118 to form a microwavable unrisen dough composition 120.

After the microwavable unrisen dough composition 120 is suitably formed in the dough-forming apparatus 116, a microwavable unrisen dough composition 120 may be fermented during transport to, in or during transport from a proofing apparatus 120 to form a yeast-leavened microwavable dough 124. After fermenting, the yeast-leavened microwavable dough 124 may be transferred from the proofing apparatus 122 to a freezing apparatus 128 to freeze the yeast-leavened microwavable dough 124 and form a frozen microwavable yeast-leavened dough 132. After freezing, the frozen microwavable yeast-leavened dough 132 may be transferred from the freezing apparatus 128 to a microwaving apparatus 134 to microwave bake the frozen microwavable yeast-leavened dough 132 and form a fresh-baked, microwavable, yeast-leavened bakery product 136.

The benefits of transforming a frozen yeast-leavened microwavable dough into a fresh-baked, microwavable yeast-leavened bakery product using microwave energy include savings in preparation time and/or labor cost, rapid and consistent preparation of yeast-leavened bakery products, extended product-shelf life or ease in serving. In fact, toughening, staling, warmed-over flavors and/or color variations that typically plague microwavable yeast-leavened bakery products during microwave baking are avoided, and preferably eliminated when practicing the present embodiment.

In general, any conventional apparatus that is suitable for use in freezing a microwavable yeast-leavened dough may be used to freeze the microwavable yeast-leavened dough 124. While the type of freezing apparatus 128 is not critical to the present invention, the freezing apparatus 128 preferably freezes the yeast-leavened microwavable dough 124 to an internal temperature of about minus 0° F. to about minus 30° F. in less than about 2 hours. Freezing times higher than about 2 hours are less desirable because such longer freezing times may negatively impact the texture of the fresh-baked, microwavable, yeast-leavened bakery product 36. An example of a suitable freezing apparatus 128 is Model No. 1500 Flex Freezer which is available from C&R Refrigerator, Inc., of Center, Tex. Another example of a suitable freezing apparatus is Model No. FT-35 Blast Freezer that is available from Armfield Ltd., of Ringwood, England. Most preferably, the freezing apparatus that is used to practice the present invention reduces the internal temperature of the yeast-leavened microwavable dough 124 to an internal temperature of less than about 0° F. in less than about 30 minutes.

The internal temperature of the yeast-leavened microwavable dough 124 may also be reduced by using a refrigeration apparatus (not shown) singly or in combination with a freezing apparatus 128. The benefits of refrigerating the yeast-leavened microwavable dough 124 include minimizing capital or equipment costs to bakers and/or food manufacturers, minimizing any negative texture changes that result in response to utilizing the freezing apparatus, or promoting a slower degree of leavening activity that would otherwise be halted when placed in a freezing apparatus. In general, any conventional apparatus that is suitable for use in refrigerating a microwavable yeast-leavened dough may be used to reduce the internal temperature of the microwavable yeast-leavened dough 124 to about 25° F. to 50° F.

The microwave baking dough additive may also be incorporated into an unrisen dough composition to form a microwavable unrisen dough composition that undergoes any number of processing steps to form desired fresh-baked, microwavable, yeast-leavened bakery products, as best depicted in FIG. 3. In process 210, a microwave baking dough additive 212 and an unrisen dough composition 214 are introduced into a dough-forming apparatus 216 that homogeneously blends the microwave baking dough additive 212 into the unrisen dough composition 214. One or more optional liquid components 218 may also be introduced into the dough-forming apparatus 216 along with the microwave baking dough additive 212 and the unrisen dough composition 214 for homogenous blending of each component in the dough-forming apparatus 216.

A microwavable unrisen dough composition 220 formed in the dough-forming apparatus 216 maybe transferred into a finishing apparatus 221, a proofing apparatus 222, a shaping apparatus 223 or any combination of any of these. Due to the incorporation of a yeast component (not shown) in the unrisen dough composition 214, and subsequently into the microwavable unrisen dough composition 220, the microwavable unrisen dough composition 220 may ferment during transport to, or transport from the finishing apparatus 221, the proofing apparatus 222, or the shaping apparatus 223.

The finishing apparatus 221 may be any apparatus that places any other food component, such as a nut, a meat, a pizza topping, a glaze, a smear or the like on the microwavable unrisen dough composition and form a finished microwavable unrisen dough composition 225. Similarly, the shaping apparatus 223 is any apparatus that is capable of shaping microwavable unrisen dough composition 220, such as a rolling pin, a second dough-forming apparatus, a mixer, a sheeting apparatus, a die cutter, or the like to form a shaped microwavable unrisen dough composition 226.

The finished microwavable unrisen dough composition 225, the shaped microwavable unrisen dough composition 226, or simply the microwavable unrisen dough composition 220 may be transferred into-the proofing apparatus. 222 for fermentation. After fermenting, a yeast-leavened microwavable dough 224 that is either finished, shaped or both finished and shaped in the proofing apparatus 222 may be transferred to a conventional baking apparatus 227, a freezing apparatus 228, a packaging apparatus 229 or any combination of any of these depending upon the desired characteristics of the fresh-baked, microwavable, yeast-leavened bakery product 236.

For example, the conventional baking apparatus 227 may partially and/or fully bake the yeast-leavened microwavable dough 224 prior to microwave baking in a microwaving apparatus 234. The benefits of partially and/or fully baking the yeast-leavened microwavable dough 224 in the baking apparatus 227 includes partial and/or full color formation or texture development in the fresh-baked, yeast-leavened microwavable bakery product 236.

Similarly, the benefits of freezing the yeast-leavened microwavable dough 224 include ease and convenience in preparing yeast-leavened bakery products that match the product attributes of fresh-baked conventional oven baked yeast-leavened bakery products. Alternatively, the yeast-leavened microwavable dough 224 may be transferred into the packaging apparatus 229 that packages the yeast-leavened microwavable dough 224 and forms a packaged yeast-leavened microwavable dough 231.

Other embodiments, such as transferring a baked microwavable yeast-leavened product 230 to the freezing apparatus 228 for freezing followed by microwaving the baked frozen microwavable yeast-leavened product (not shown), to form the microwaved yeast-leavened bakery product 236 are also contemplated within the scope of the present invention.

The conventionally baked yeast-leavened bakery product 230 or the packaged yeast-leavened microwavable dough 231 may be transferred into a freezing apparatus 228 to form a frozen, yeast-leavened microwavable bakery product 232 that is either conventionally baked and/or packaged. The frozen, yeast-leavened microwavable bakery product 232 is subsequently transferred into the microwaving apparatus to bake the frozen yeast-leavened microwavable bakery product via the application of microwave energy.

Delivery of a frozen, partially and/or fully baked yeast-leavened bakery product to a baker and/or food manufacturer facilitates easy transformation into the fresh-baked microwavable yeast-leavened bakery product 236 after application of microwave energy by the microwaving apparatus 234 without observing any toughening and/or staling in the fresh-baked microwavable yeast-leavened bakery product 236 even after a substantial amount of time from microwave baking. Similarly, partial and/or full baking of the yeast-leavened microwavable dough may safely undergo further baking by application of microwave energy without undergoing rapid toughening and/or staling during or after application of microwave energy.

Therefore, fresh-baked, microwavable, yeast-leavened bakery products 236 such as coffee cakes, sweet rolls like cinnamon rolls, raised donuts, stollens, Swedish tea rings, Sally Lunn, breads like Italian and French breads, bagels, pizzas, English muffins or any other yeast-leavened bakery product that include the microwave baking dough additive may be prepared in accordance with the present invention.

The present invention is more particularly described in the following examples that are intended as illustrations only since numerous modifications and variations within the scope of the present invention will be apparent to those skilled in the art.

EXAMPLES

Example 1

This example illustrates a method for producing a fresh-baked, microwavable, yeast-leavened pizza product in accordance with the present invention. A dough additive composition and an unrisen pizza dough composition were introduced into a mixer. The concentration and weights of the components in the dough additive composition are presented in Table 3 below:

TABLE 3

| COMPONENT | CONCENTRATION (weight %)[#] |
|---|---|
| Flour | 29.34 |
| Cellulose (1) | 10.27 |
| Cellulose (2) | 5.13 |
| Oil | 1.47 |
| Sodium Alginate | 22.00 |
| Calcium Acetate | 16.50 |
| Soy Protein Isolate | 9.17 |
| Shortening | 5.87 |
| Enzyme | 0.25 |

[#]based on the total weight of the dough additive composition.

The flour, Spring-Hearth® enriched unbleached wheat flour, the oil, soybean salad oil and the shortening, all-purpose shortening were supplied by Cargill Incorporated of Minneapolis, Minn. The first cellulose was Solka Floc® 200 supplied by Fiber Sales and Development Corporation of Urbana, Ohio. The second cellulose component, Cellogen HP-8A and the sodium alginate were supplied by Multi-Kem Corporation of Ridgefield, N.J. Calcium acetate was supplied by American International Chemical, Inc., of Natick, Mass. The soy protein isolate was Soy Isolate FP-760 from Protein Technologies, Inc., of St. Louis, Mo. The enzyme was Fungamyl Super MA that is available from Novo Nordisk Biochem of North America located in Franklinton, N.C.

The components and weights for the microwavable unrisen pizza dough composition that includes the dough additive composition are presented in Table 4 below:

TABLE 4

| COMPONENT | WEIGHT (POUNDS) |
|---|---|
| Patent Flour | 100 |
| Dough Conditioner | 0.5 |
| Water | 56 |
| Sugar | 3 |
| Salt | 2 |
| Shortening | 4 |
| Yeast | 3 |
| Dough Additive Composition | 1 |

Patent flour and salt were supplied by Cargill Incorporated of Minneapolis, Minn. Sugar was supplied by United Sugars Corporation of Bloomington, Minn. The shortening was an all-purpose shortening supplied by Archer Daniels Midland Company of Decatur, Ill. The yeast was supplied by Fleischmann's® Yeast® of Fenton, Mo. The dough improver was No-Bro-Do Improver that is available from Brechet & Richter of Golden Valley, Minn.

The microwavable unrisen pizza dough composition was blended in a Hobart spiral mixer operated at a "low" speed for about 1 minute followed by operating the Hobart mixer at a "medium" speed for about 8 minutes. After mixing, After mixing the dough, the dough is formed into a ball which is subsequently flattened out via a rolling pin. After rolling, the pizza dough was sprinkled with cornmeal that coated the bottom of the pizza dough. After coating, the pizza dough was fermented for about 1 hour at 110° F. and 30% humidity. After fermenting, the pizza dough was cut into a mini disk shape having a diameter of about 5 inches. After cutting, the pizza dough mini-disk was placed in a −6° F. freezer supplied by Traulsenn and Co., Inc. of College Point, N.Y. that froze the pizza dough.

After freezing, a frozen pizza dough was removed from the freezer and placed on a susceptor plate of about 6 inches in diameter. About 1 ounce of Contadina® pizza sauce was spread onto the frozen pizza dough mini-disk. About 1 ounce of Crystal Farms Mozzarella Cheese of Minneapolis, Minn. was sprinkled onto the pizza sauce. Four pieces of pepperoni supplied by Hormel Foods Corporation of Austin, Minn. was placed on top of the cheese. The frozen pizza dough along with the pizza sauce, cheese and pepperoni were placed in a Sanyo Microwave Super Show-Ware 1000 watt microwave oven and microwave baked on "high" for about 2 minutes. During microwaving, the frozen pizza dough changed from a milky white color to a baked brownish-yellow color that indicated a fresh baked microwavable yeast-leavened pizza product.

Evaluations of this fresh-baked microwavable pizza product were excellent in that there were no textural variations, such as gumminess, hardness, toughness or sogginess in the pizza crust. In fact, the pizza product maintained a uniformed texture in which there were no observable large, gaping holes that indicated improper fermentation. Rapid toughening and/or staling that typically occurs after microwave baking of pizzas was not observed even after about 30 minutes of the pizza product sitting on the table. The pizza product maintained a soft, chewy, clean bite that did not change during the entire one hour evaluation time period. Additionally, the pizza sauce sat on top of the pizza crust and did not migrate into the pizza crust. Furthermore, the pizza product did not get soggy nor soak up any sauce during the evaluation period. Lastly, there were no detectable differences between a fresh-baked oven pizza and this microwaved pizza product.

Example 2

This example illustrates a method of preparing a microwavable cinnamon roll in accordance with the present invention. A cinnamon roll concentrate that includes the microwave baking dough additive composition of Table 3 was prepared using the components and concentrations presented in Table 5 below:

TABLE 5

| COMPONENT | CONCENTRATION (weight %)* |
|---|---|
| Mighty Soft Emulsifier | 2.15 |
| Granulated Sugar | 29.62 |
| Granulated Salt | 6.80 |
| Nonfat DryMilk | 16.00 |
| SSL Paniplex Emulsifier | 1.50 |
| Dried Egg Yolk | 2.15 |
| Annatto Color | 0.02 |
| Tumeric Color | 0.06 |
| Oil | 2.15 |
| Baking Soda | 8.50 |
| Baking Powder (1) | 7.25 |
| Baking Powder (2) | 1.25 |
| Dough Additive Composition | 8.50 |
| Dough Improver | 2.15 |
| Gluten | 8.50 |
| Cellulose | 3.00 |
| Xanthan Gum | 0.40 |

*based on the total weight of the cinnamon roll concentrate

Vital wheat gluten, dried egg yolk and salt were supplied by Cargill Incorporated of Minneapolis, Minn. Sugar was supplied by United Sugars corporation of Bloomington, Minn. The shortening was an all-purpose shortening supplied by Archer Daniels Midland Company of Decatur, Ill. The yeast was supplied by Fleischmann's® Yeast® of Fenton, Mo. The dough improver was No-Bro-Do Improver that is available from Brechet & Richter of Golden Valley, Minn. Xanthan gum was KELTROL® xanthan gum supplied by Monsanto Company of St. Louis, Mo. The cellulose was Solka Floc® 200 supplied by Fiber Sales and Development Corporation of Urbana, Ohio.

An unrisen cinnamon roll dough was prepared by blending the cinnamon roll concentrate with the dough composition presented below in Table 6 below:

TABLE 6

| COMPONENT | Weight (pounds)* |
|---|---|
| Cinnamon Roll Concentrate | 50 |
| Patent Bread Flour | 150 |
| All Purpose Shortening | 42.5 |
| Fresh Yeast | 27.5 |
| Water | 94.5 |

The unrisen cinnamon roll dough was mixed for about 1 minute on "second" speed of a four-speed mixer and then for about 13 minutes on the "third" speed of the four-speed mixer. The temperature of the unrisen cinnamon roll dough was about 72° F. After mixing, the unrisen microwavable cinnamon roll dough was allowed to ferment for about 15 minutes at a room temperature of about 70° F. After fermenting, the yeast-leavened microwavable cinnamon roll dough was sheeted out, coated with salad oil and smeared with about 2 pounds of a cinnamon smear. The cinnamon smear was distributed evenly across the cinnamon roll dough while leaving a blank bottom edge for sealing. After smearing, the cinnamon roll dough was then carefully rolled to obtain four curls per row and cut with a French knife to yield 4 oz. individual microwavable cinnamon roll dough pieces. After cutting, each individual roll was placed in a sheet pan and sprayed with a 30% solution of Maillose® supplied by Red Arrow Products Co., LLC., of Manitowoc, Wis. The cinnamon rolls were then frozen overnight in a −6° F. freezer supplied by Traulsenn and Co., Inc. of College Point, N.Y. The next morning, the frozen cinnamon rolls were placed on a Chinette® plate and microwaved in a 1,000 watt Super Sanyo Show-Ware Microwave Oven for about 1 minute and 45 seconds. During microwaving, the microwavable cinnamon roll expanded to a volume that was about 4 times the original volume. The fresh-baked microwavable cinnamon rolls were removed from the microwave oven and evaluated. The results of this evaluation were spectacular in that a fresh-baked cinnamon roll bakery product without any textural variations, such as toughness, chewiness, sogginess, or any other negative defects in the texture of this cinnamon roll product were observed. Additionally, a uniform crumb texture was observed after slicing the cinnamon roll product in half. There were no large gaping holes that indicated improper fermentation. Furthermore, the cinnamon roll maintained a soft chewy texture even after about 30 minutes from the microwave baking step.

Although the present invention has been described with reference to preferred embodiments, workers skilled in the art will recognize that changes may be made in form and detail without departing from the spirit and scope of the invention.

What is claimed is:

1. A method of forming a fresh-baked, microwavable yeast-leavened bakery product, the method comprising:
    providing a microwave baking dough additive, the microwave baking dough additive comprising a gelling component, a gum component and an enzyme component, wherein the gelling component is effective to gel the gum component;
    applying the microwave baking dough additive to a dough composition comprising yeast to form a microwavable dough composition;
    proofing the microwavable dough composition to form a yeast-leavened microwavable dough composition; and
    microwaving the yeast-leavened microwavable dough composition to form a fresh-baked, microwavable yeast-leavened bakery product.

2. A method of controlling moisture migration, the method comprising:
    providing a microwave baking dough additive, the microwave baking dough additive comprising a gelling component, a gum component and an enzyme component, the gelling component effective to gel the gum component;
    applying the microwave baking dough additive to a dough composition comprising yeast to form a microwavable dough composition; and,
    wherein the microwave baking dough additive is characterized by being capable of controlling moisture migration.

3. A method of producing a fresh-baked, microwavable, yeast-leavened bakery product, the method comprising:
    providing a microwave baking dough additive, the microwave baking dough additive comprising a gelling component, a gum component and an enzyme component, wherein the gelling component is effective to gel the gum component;
    applying the microwave baking dough additive to a dough composition comprising yeast to form a microwavable dough composition;
    proofing the microwavable dough composition to form a yeast-leavened microwavable dough composition;
    freezing the yeast-leavened microwavable dough composition to form a frozen yeast-leavened microwavable dough;
    microwaving the frozen, yeast-leavened microwavable dough to form a fresh-baked, microwavable yeast-leavened bakery product; and
    wherein the microwave baking dough additive is capable of controlling moisture migration and starch recrystallization in the fresh-baked, microwavable yeast-leavened bakery product.

4. A method of forming a microwavable dough, the method comprising:
    combining a gelling component, a gum component and an enzyme component to form a microwave baking dough additive, the gelling component effective to gel the gum component;
    blending the microwave baking dough additive into a dough composition comprising yeast to form a microwavable dough; and
    wherein the microwave baking dough additive is an amount that is effective in controlling moisture migration and starch recrystallization in the microwavable dough.

5. The method of claim 4 and further including proofing the microwavable dough to form a yeast-leavened microwavable dough.

6. The method of claim 5 and further including freezing the microwavable dough to form a frozen, yeast-leavened microwavable dough.

7. The method of claim 6 and further including microwaving the frozen, yeast-leavened microwavable dough to form a fresh-baked, microwavable yeast-leavened bakery product.

8. The method of claim 5 and further including microwaving the yeast-leavened microwavable dough to form a fresh-baked, microwavable yeast-leavened bakery product.

9. The method of claim 1 wherein the gelling component is calcium acetate, calcium citrate, calcium gluconate, calcium glycerol phosphate mono-calcium phosphate, mono-calcium phosphate anhydrous, di- and tri-calcium phosphate, calcium sulfate, calcium carbonate, calcium lactate, calcium phosphite or any combination of any of these.

10. The method of claim 9 wherein the gelling component is calcium acetate.

11. The method of claim 1 wherein the gum component is sodium alginate, ammonium alginate, sodium calcium alginate, calcium alginate, potassium alginate, esters of alginic acid like acetyl esters, ethyl esters, propyl esters, butyl esters, pentyl esters, hexyl esters, heptyl esters, octyl esters, nonyl esters, decyl esters, propyl glycerol alginate or any combination of any of these.

12. The method of claim 11 wherein the gum component is sodium alginate.

13. The method of claim 1 wherein the enzyme component is an alpha-amylase, a beta-amylase, an amyloglucosidase, an alpha-glucosidase, a beta-glucosidase, a pullalanase, a dextranase, an isoamylase, a cellulase, a hemicellulase, a pentosonase, a xylanase, a lipase, an oxidase, an acid protease, an aminopeptidase, a carboxypeptidase, a sulfhydryl protease, an alkaline protease, a serine protease, a neutral protease, an endo-protease, an exo-protease, or any combination of any of these.

14. The method of claim 13 wherein the enzyme component is a xylanase.

15. A method of forming a microwavable dough, the method comprising:

providing a microwave baking dough additive, the microwave baking dough additive comprising a gelling component, a gum component, and an enzyme component, wherein the gelling component is effective to gel the gum component; and applying the microwave baking dough additive to a dough composition comprising yeast to form a microwavable dough.

16. The method of claim 15 wherein the gelling component is calcium acetate.

17. The method of claim 15 wherein the gum component is sodium alginate.

18. The method of claim 15 wherein the enzyme component is a xylanase.

19. The method of claim 2 wherein the gelling component is calcium acetate.

20. The method of claim 2 wherein the gum component is sodium alginate.

21. The method of claim 2 wherein the enzyme component is a xylanase.

22. The method of claim 3 wherein the gelling component is calcium acetate.

23. The method of claim 3 wherein the gum component is sodium alginate.

24. The method of claim 3 wherein the enzyme component is a xylanase.

25. The method of claim 4 wherein the gelling component is calcium acetate.

26. The method of claim 4 wherein the gum component is sodium alginate.

27. The method of claim 4 wherein the enzyme component is a xylanase.

28. A product prepared by the method of claim 4 having an ability to control moisture migration and starch recystrallization in the microwavable dough.

29. A product prepared by the method of claim 15 having an ability to control moisture migration and starch recystrallization in the microwavable dough.

30. A method of forming a microwavable dough, the method comprising:

providing a microwave baking dough additive, the microwave baking dough additive comprising sodium alginate, calcium acetate and xylanase, wherein the calcium acetate is effective to gel the sodium alginate; and applying the microwave baking dough additive to a dough composition comprising yeast to form a microwavable dough.

31. The method of claim 30 and further including freezing the microwavable dough to form a frozen microwavable dough.

32. The method of claim 31 and further including microwaving the frozen microwavable dough to form a fresh-baked microwavable yeast-leavened product.

33. The method of claim 30 and further including microwaving the microwavable dough to form a fresh-baked microwavable yeast-leavened product.

34. A microwavable dough product prepared by the method of claim 30, wherein the microwavable dough does not undergo toughening and staling after application of microwave energy.

* * * * *

UNITED STATES PATENT AND TRADEMARK OFFICE
CERTIFICATE OF CORRECTION

PATENT NO.   : 6,579,546 B1
DATED        : June 17, 2003
INVENTOR(S)  : Michael Jahnke It is certified that error appears in the above-identified patent and that said Letters Patent is hereby corrected as shown below:

<u>Title page,</u>
Item [54], delete "METHOD OF MAKING MICROWAVABLE YEAST-LEAVENDED BAKERY PRODUCT CONTAINING DOUGH ADDITIVE", insert -- DOUGH ADDITIVE --

Signed and Sealed this

Ninth Day of December, 2003

JAMES E. ROGAN
*Director of the United States Patent and Trademark Office*